United States Patent [19] [11] 4,313,582
Hasquenoph et al. [45] Feb. 2, 1982

[54] DEVICE WITH INDEPENDENT HOOKS AND AUTOMATIC LOCKING MECHANISM FOR HOOKING UP LOADS UNDER AIRCRAFT

[75] Inventors: Jean H. Hasquenoph, Lagny; Pierre F. Coutin, Paris, both of France

[73] Assignee: R. Alkan & Cie, France

[21] Appl. No.: 74,629

[22] Filed: Sep. 12, 1979

[30] Foreign Application Priority Data

Dec. 15, 1978 [FR] France ................................ 78 35346
Jan. 22, 1979 [FR] France ................................ 79 01479
Apr. 20, 1979 [FR] France ................................ 79 10009

[51] Int. Cl.³ .......................... F41F 5/02; B64D 1/02
[52] U.S. Cl. .............................. 244/137 R; 89/1.5 G; 89/1.5 H
[58] Field of Search ................ 244/137 R; 294/83 R, 294/83 AB, 83 AE; 89/1.5 R, 1.5 F, 1.5 G, 1.5 C, 1.5 H

[56] References Cited

U.S. PATENT DOCUMENTS 2,491,400 12/1949 Thumim .......................... 89/1.5 G
3,982,466 9/1976 Baker ............................ 244/137 R
4,049,222 9/1977 Peterson ......................... 89/1.5 G
4,129,291 12/1978 Hasquenoph ..................... 89/1.5 G
4,168,046 9/1979 Hasquenoph et al. .............. 89/1.5 G Primary Examiner—Galen L. Barefoot
Attorney, Agent, or Firm—William A. Drucker

[57] ABSTRACT

This device with independent hooks and automatic locking mechanism for hooking loads suspended under aircraft comprises an effort scaling-down device associated with each hook, mechanisms for coupling the two scaling-down mechanisms with each other, and the detent-positioning of this coupling mechanism through the medium of a third common scaling-down device. Thus, the preliminary manual cocking, i.e. the detent-positioning of the coupling, provides at the same time the simultaneous resetting of the first pair of effort scaling-down mechanisms associated therewith, so that the suspension hooks are free with respect to the retaining mechanism and can pivot to their closed position independently of each other under the action of the load suspension rings when the load is fixed in position, the third scaling-down device further assisting in reducing the efforts exerted on the common retaining pawl, the raising of this common pawl being necessarily attended by the simultaneous opening of the hook.

16 Claims, 29 Drawing Figures

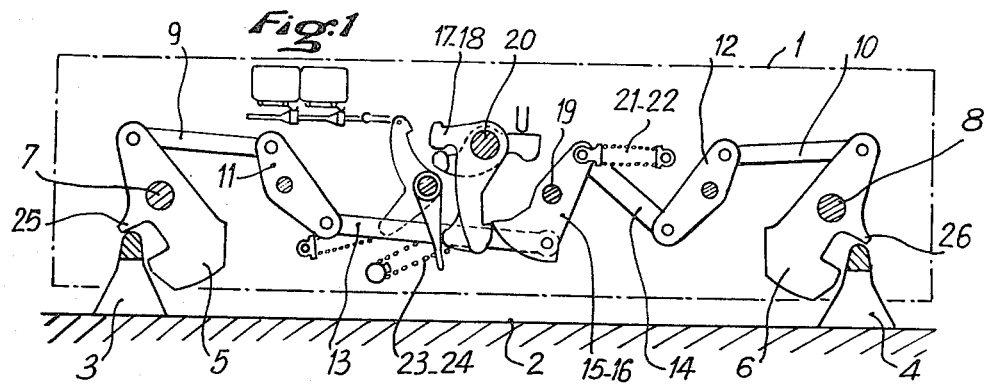
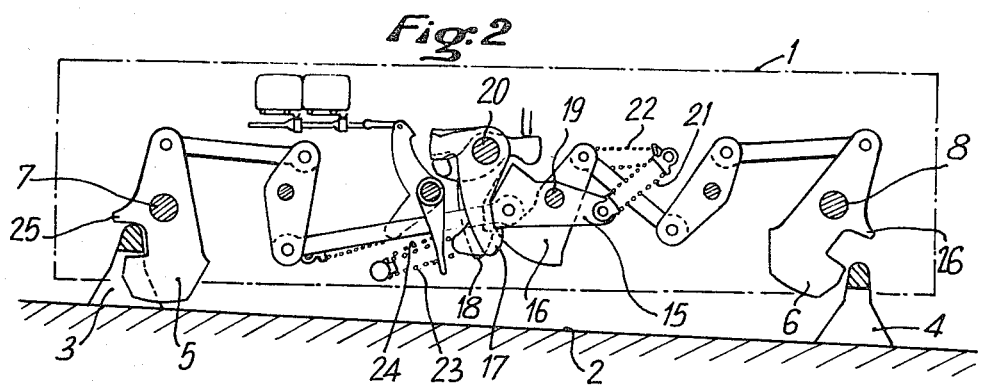
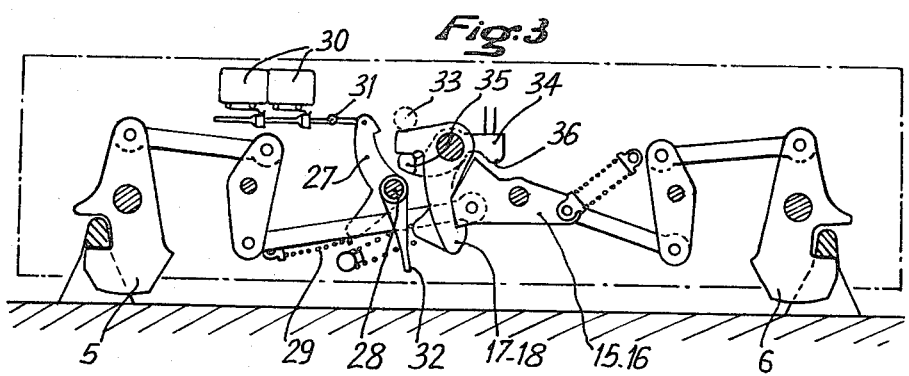
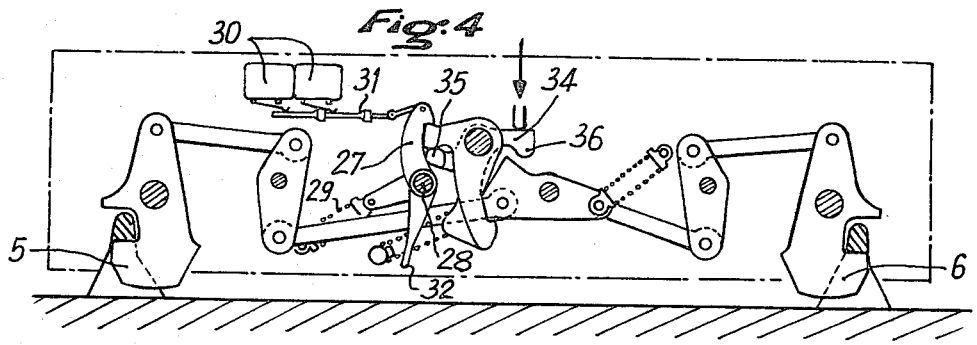

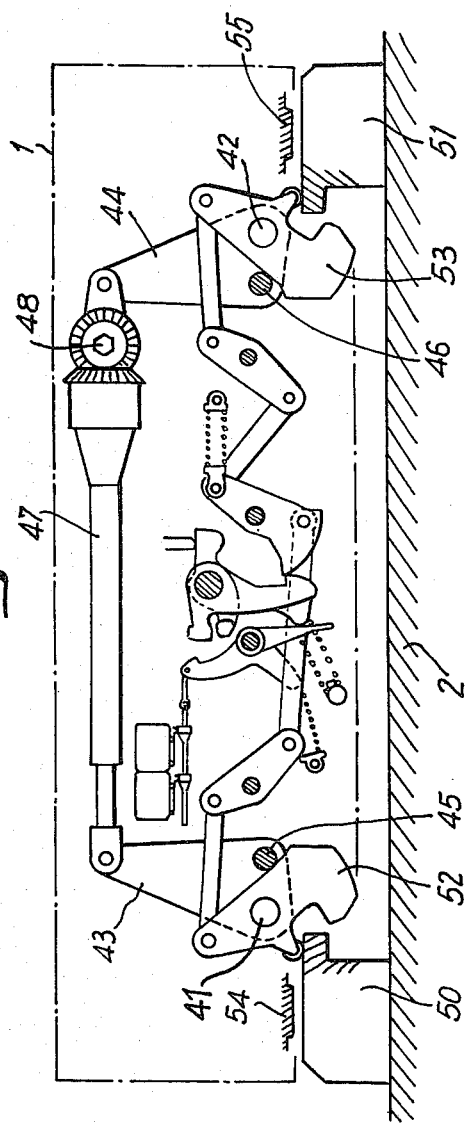

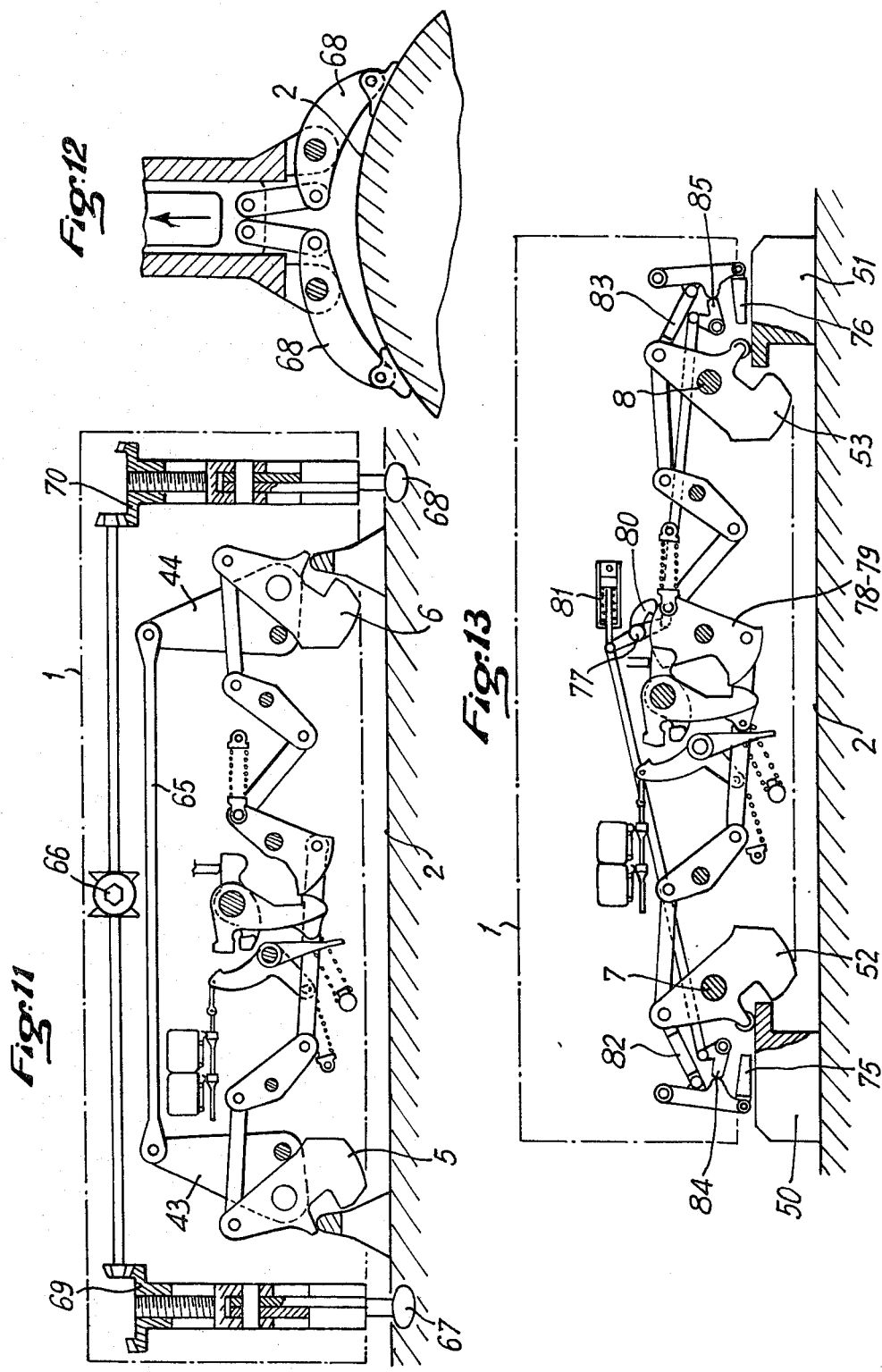

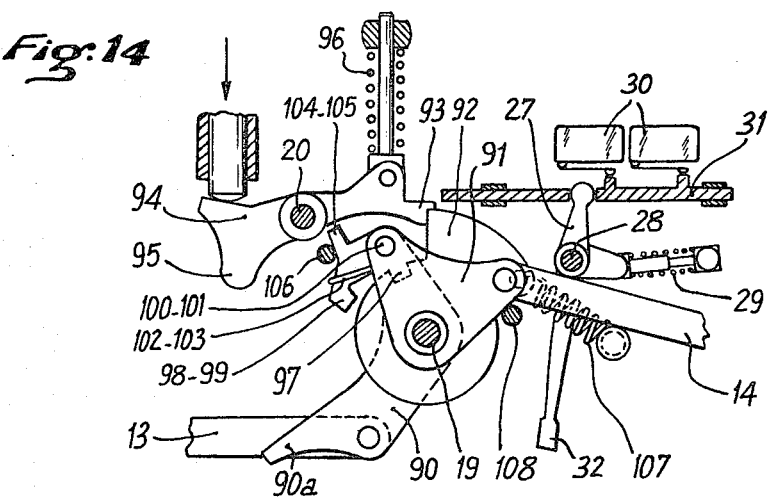
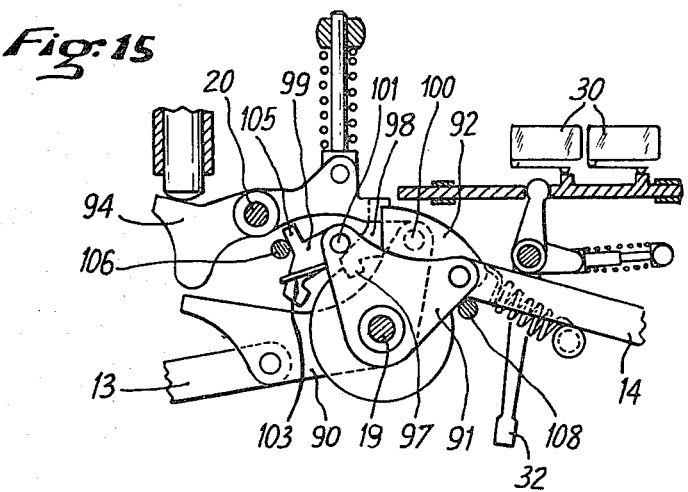
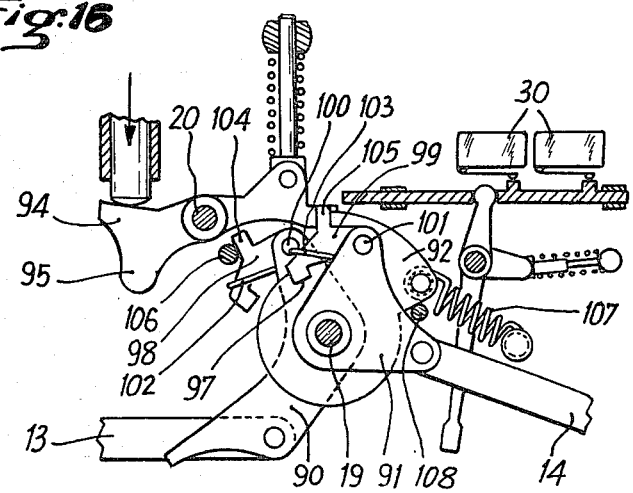

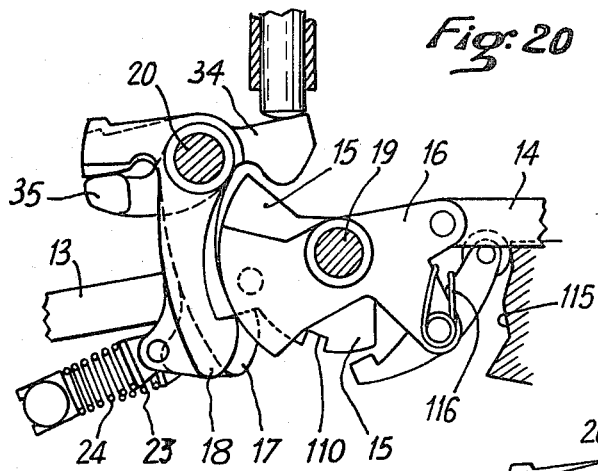
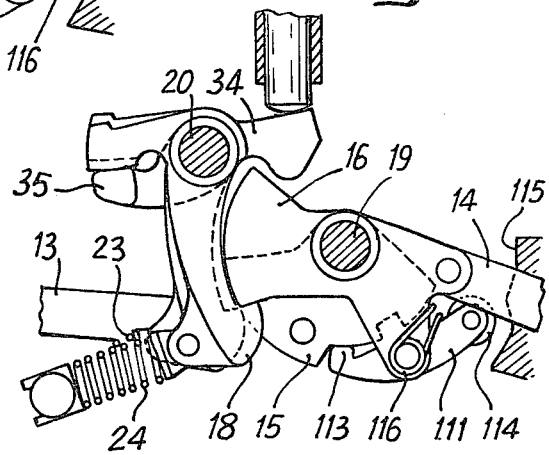
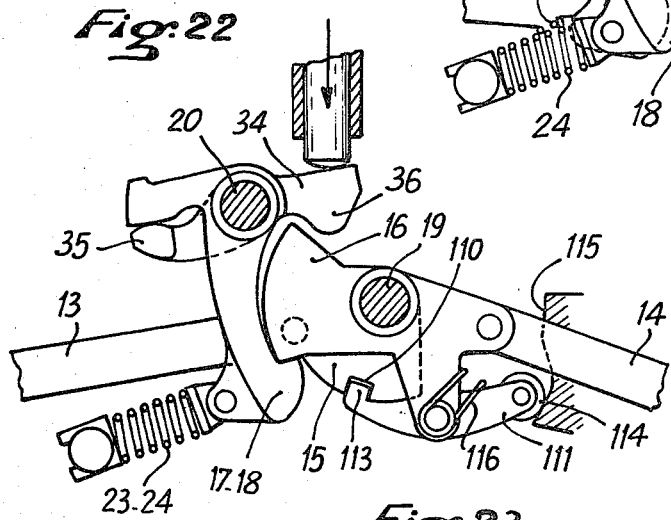
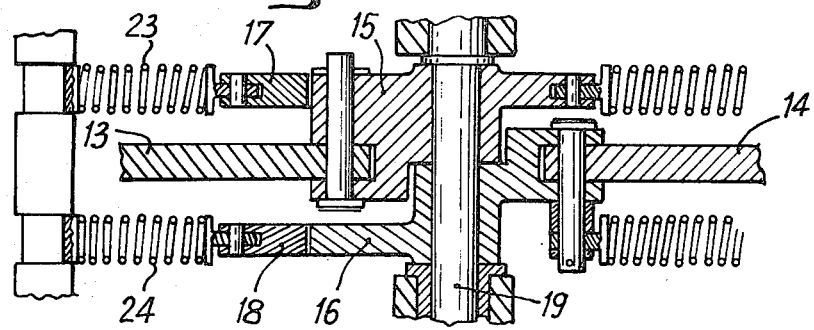

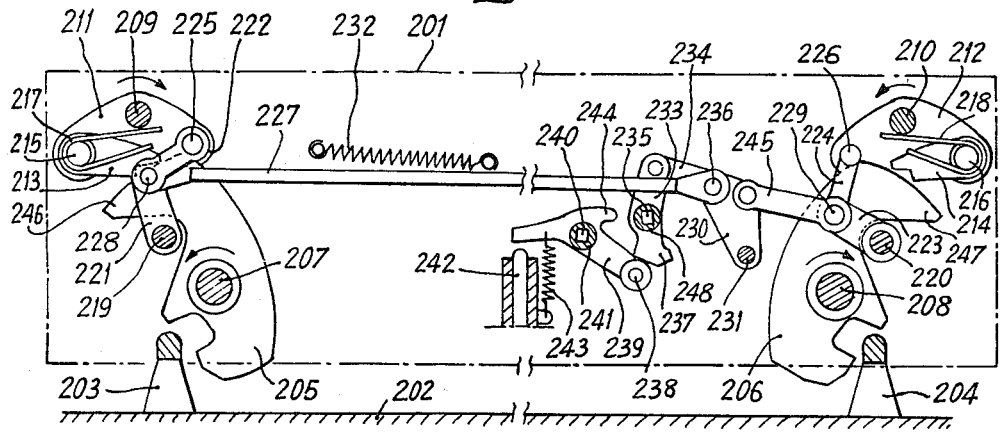
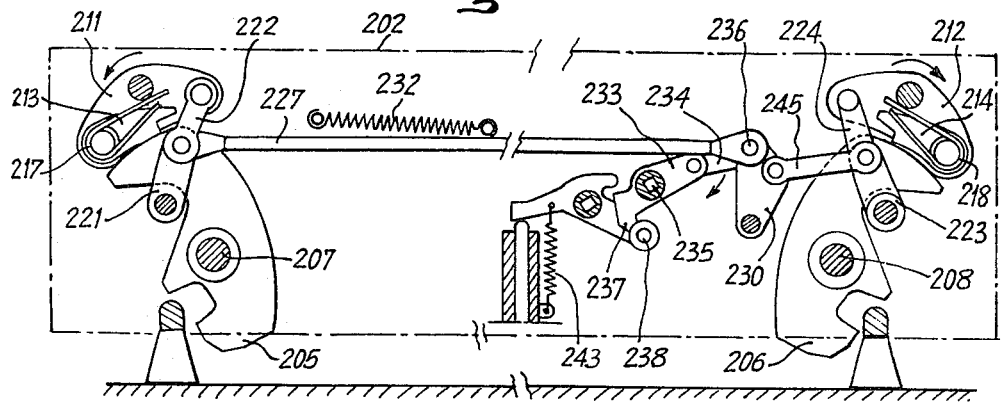
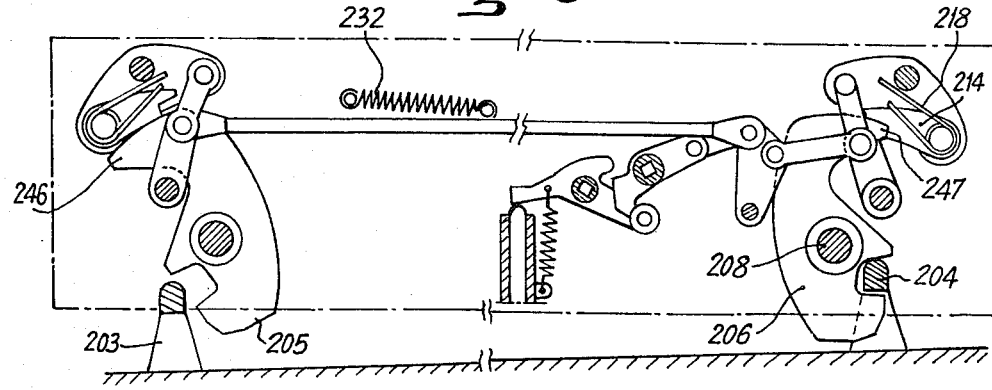

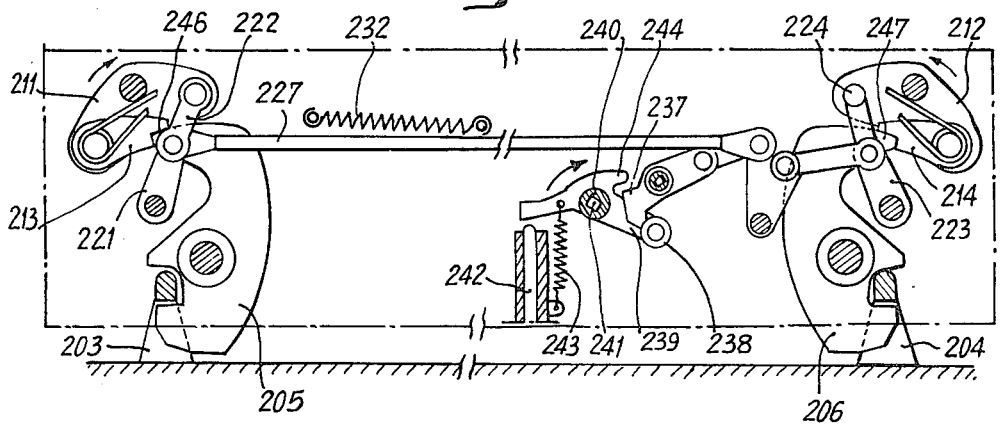
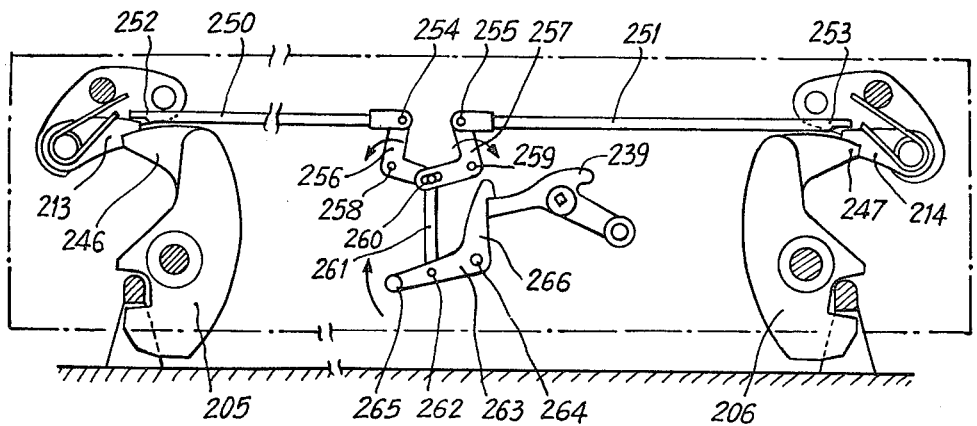
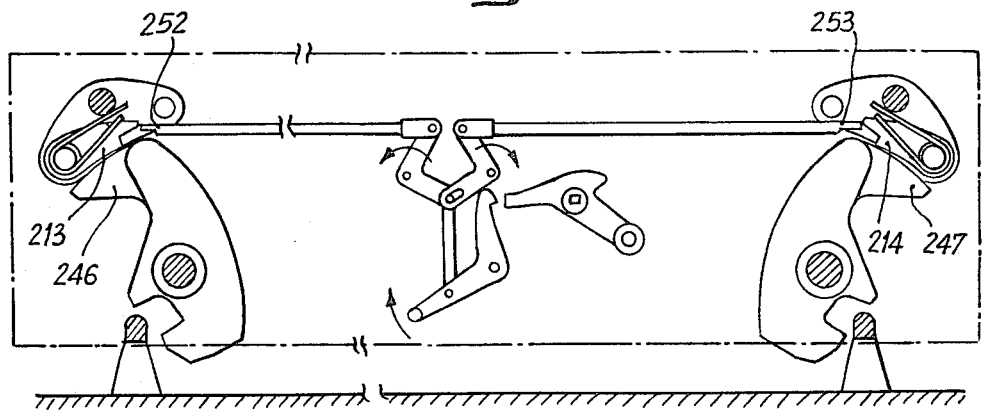

DEVICE WITH INDEPENDENT HOOKS AND AUTOMATIC LOCKING MECHANISM FOR HOOKING UP LOADS UNDER AIRCRAFT

BACKGROUND OF THE INVENTION

1. Field of the Invention

As a rule, loads carried under aircraft are provided with a pair of rings or so-called "saddles" engageable by the hook means of the carrier or suspension device.

When the hooks are operatively interconnected, the load must be presented in such a way that the two hooks engage simultaneously the two rings or saddles. However, this constraint is sometimes objectionable and therefore trigger means have been proposed in the art, wherein the hooks can be locked independently of each other so that they can be closed successively in lieu of simultaneously.

2. Summary of the Invention

The present invention relates to release or trigger means of this character. However, this invention departs from the prior art on the one hand in that it comprises an effort scaling-down kinematic chain associated with each hook, the two chains leading to a double automatic detent or interlocking device permitting the simultaneous release of the two hooks through the actuation of a known mechanical or pyrotechnical control system, and on the other hand in that it makes it possible to combine this assembly with either of the devices described and illustrated in prior patents and patent applications held or filed by the same Applicants namely permitting the equal distribution of the control force among the hooks, the centralized control of the load wedging action, and the load wedging by means of wedge members.

The above-mentioned patents and patent applications include notably the U.S. patent application Ser. No. 949 484 filed on Dec. 30, 1977 which discloses the centralized control of the wedging means by raising the hooks means, and the U.S. Pat. No. 3,954,233 which discloses the wedging means.

It is clear that the device is also applicable when the trigger system is completed by a known jettisoning or ejection system, when the loads are wedged by using screw means according to another known arrangement, and when the hook-up device comprises not only hooks disposed at the standard 14-inch spacing but also hooks disposed at the standard 30-inch spacing.

The double locking mechanism comprises two independent latch members operatively connected to the two retaining hooks, respectively, by means of a pair of effort scaling-down kinematic chains, these two latch members cooperating with a pair of pawls the simultaneous release of which is attended by the release of two latch members. These latch members are in fact released under the control of a release lever responsive to a trigger control system so as to engage at the same time both pawls for releasing the two latch members, and these latch members proper, in order to start their movement in the hook opening direction if necessary, so as to exert a "knee-breaking" action on the relevant kinematic chains.

When the release lever is tilted as a consequence of a normal power action such as the one produced by one of the known devices, the knee-breaking action exerted on the latch members and the relevant kinematic chains takes place just after the release action and its effects on the two chains are substantially simultaneous. On the other hand, when the device is unlatched very slowly, for example by using a manual control system, it may happen (unless the parts involded are machined with a high degree of precision) that one of the latch members be released shortly before the other and that the corresponding unstressed kinematic chain may thus permit the opening of the relevant hook while the other hook remains closed. In this case, serious damages might result as far as the still engaged hook means are concerned.

To avoid the risk explained hereinabove, it is one object of this invention to provide means such that it is possible to use a safety device for preventing any risk of opening one hook before the other hook is open, irrespective of the slowness of the release action and of the time elapsing from the moment the latch members are released to the moment the knee-breaking means operate efficiently. This safety device comprises means associated with the two lockable retaining latch members in order automatically to couple these two latch members at the end of the locking action and to maintain this coupling action until the two hook members open simultaneously and nearly completely. Under these conditions, the movement of one latch member to open the relevant hook involves positively the movement of the other latch member so that the two hooks can open only simultaneously.

When the load weight is particularly heavy, it causes prohibitive stress to develop in the carrier device and notably in the retaining detent means thereof, unless successive effort scaling-down devices are provided to prevent any jamming effect on the pawls during their release.

Besides, it is advantageous to scale down the efforts as close as possible to each hook, so that the dimensions of the next component elements of the kinematic chain can be reduced, the latter being consequently less loaded.

The present invention takes due consideration of these complementary data by providing a specific arrangement of the component elements of the carrier device comprising a scaling-down mechanism associated with each hook, means for coupling the two scaling-down mechanisms with each other, and the detent-positioning of this coupling means through the medium of a third common scaling-down device.

The preliminary manual cocking, i.e. the detent-positioning of the coupling provides at the same time the simultaneous resetting of the first pair of effort scaling-down mechanisms associated therewith. Under these conditions, the hooks are free with respect to the retaining mechanism and can pivot to their closed position independently of each other under the action of the load rings when the load is fixed in position.

At the end of the closing movement, each hook is brought separately into locking engagement with the pawl of the effort scaling-down device associated therewith.

The third common scaling-down action further assists in reducing the efforts exerted on the common retaining pawl. The upward movement of this common pawl is necessarily attended by the simultaneous opening of the hook means, as will be explained presently.

Various forms of embodiment of the independent-hook and automatic-locking device according to this invention for loads carried or suspended under aircraft will now be described in detail with reference to the accompanying drawings.

BRIEF DESCRIPTION OF THE DRAWINGS

FIG. 1 illustrates diagrammatically a hook mechanism comprising two separate hooks, both shown in their open position;

FIG. 2 is a similar view of the mechanism of FIG. 1 but shown in the position corresponding to the closing of only one hook;

FIG. 3 illustrates the same mechanism with both hooks shown in their closed position;

FIG. 4 illustrates the control of the proper detent-positioning or locking device of the mechanism;

FIG. 9 illustrates the mechanism of FIG. 5 in case the load is provided with saddle members;

FIG. 10 is a fragmentary plane view from above of the so-called saddle members comprising two recesses and corresponding twin-nose hook means;

FIG. 11 illustrates the combination of the device of FIG. 1 with a device for equally distributing the stress among the hooks and with a central system for controlling the load wedging action by causing bearing members to be lowered and pressed against the load;

FIG. 12 is a fragmentary cross-sectional view showing one of the load wedging devices, which causes the load to be wedged by the downward movement of bearing members there against;

FIG. 13 illustrates the combination of the device of FIG. 1 with a device for automatically wedging the load by means of wedge members, according to the U.S. Pat. No. 3,954,233;

FIG. 14 is an elevational and part-sectional view of a safety mechanism according to this invention, shown in the position corresponding to the opening of both hooks;

FIG. 15 is a view similar to FIG. 14 showing the same mechanism in the position corresponding to the closing of a single hook;

FIG. 16 is a view similar to FIG. 15 showing the device in the position corresponding to the closing of the other hook;

FIGS. 19, 20, 21, 22 and 23 are fragmentary sections showing a modified form of embodiment of the mechanism, which correspond to FIGS. 14, 15, 16, 17 and 18, respectively, for the positions illustrated;

FIG. 24 illustrates the complete device with the hooks open and the mechanism released;

FIG. 25 illustrates the complete device with the hooks open and the mechanism reset, the effort scaling-down mechanisms associated with each hook being cocked;

FIG. 26 illustrates the device in its position corresponding to the closing of a single hook;

FIG. 27 illustrates the device in the position corresponding to the closing of both hooks;

FIG. 28 illustrates a mechanism for checking the proper operation of the detent-positioning control device when the hooks are closed and locked.

FIG. 29 illustrates the same checking mechanism when the hooks are open.

DESCRIPTION OF THE PREFERRED EMBODIMENTS

Figure 5:
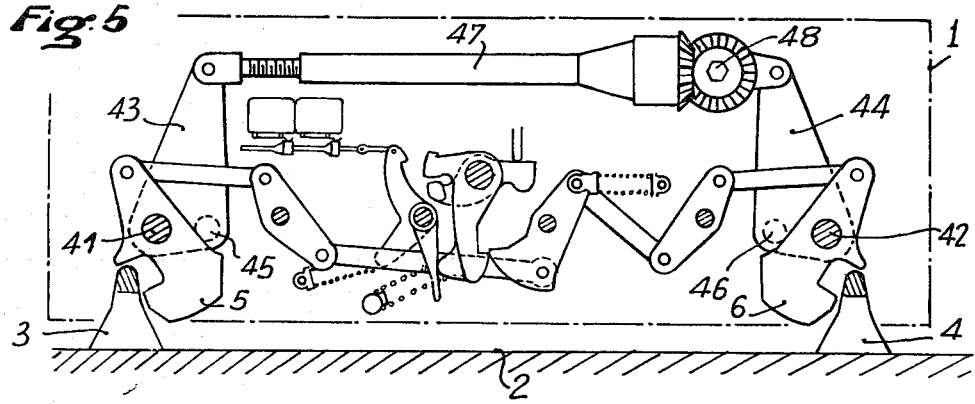
FIG. 5 illustrates the combination of the device of FIG. 1 with a device for equally distributing the effort among the hooks, and the central control means for wedging the load by raising the hooks.

Firstly, the exemplary forms of embodiment illustrated in FIGS. 1 to 13 of the drawings will be described. Then, a first typical example of a possible safety device will be described with reference to FIGS. 14 to 18 and another exemplary form of embodiment of a safety device will be described with reference to FIGS. 19 to 23; finally, an exemplary arrangement comprising an effort scaling-down device associated with each hook and a system for interconnecting these two scaling-down devices, and the detent-positioning means interposed in this system by means of a third scaling-down device, will be described with reference to FIGS. 24 to 29.

In FIGS. 1 and 2 of the drawings, the reference numeral 1 designates the diagrammatic contour of a trigger device, 2 designating the load provided with suspension rings 3 and 4, and 5, 6 being the hook members of the trigger device which are pivoted to fixed pivot members 7 and 8, respectively; furthermore 9, 11, 13, 15 and 17 designate the effort scaling-down kinematic chain, constructed according to a conventional principle and coupled to hook 5, and the reference numerals 10, 12, 14, 16 and 18 designate a similar chain associated with the other hook 6 and independent of the first chain. The latch members 15 and 16 fulcrumed on a common pivot member 19, and the pawls 17 and 18, pivoted to a common fixed pivot member 20, are merged into each other in FIG. 1, but distinguish from one another in FIG. 2, together with the bistable springs 21 and 22 controlling the latch members 15, 16 and the return springs 23, 24 constantly urging the pawls 17, 18 to their locking positions. The hooks 5, 6 comprise counterbeaks 25, 26 urged upwards by rings 3 and 4, in order to warrant the independent detent-positioning of latch members 15 and 16 coupled to the hooks 5 and 6, respectively, by means of the aforesaid effort scaling-down kinematic chains.

In FIGS. 3 and 4, illustrating the two hook control systems in their detent-positioning condition, the reference numeral 27 designates a lever for checking the proper detent-positioning which is fulcrumed to a pivot member 28 and stabilized in its two end positions by a spring 29. The reference numeral 30 designates electric switches actuated by a rod 31 connected to the lever 27 rigid with a control handle 32. A safety spindle shown at 33 may be used, if desired. The release is obtained by means of a lever 34 fulcrumed to pivot member 20 and adapted to actuate through its end 35 the pair of pawls 17, 18 when lever 27 is in the position shown in FIG. 3.

In FIG. 5, the hooks 5 and 6 are fulcrumed at 41 and 42, respectively, to levers 43 and 44 pivoted in turn on fixed pivot members 45 and 46 interconnected by a stretching-screw 47 responsive to a single control mechanism shown at 48.

Figure 6:
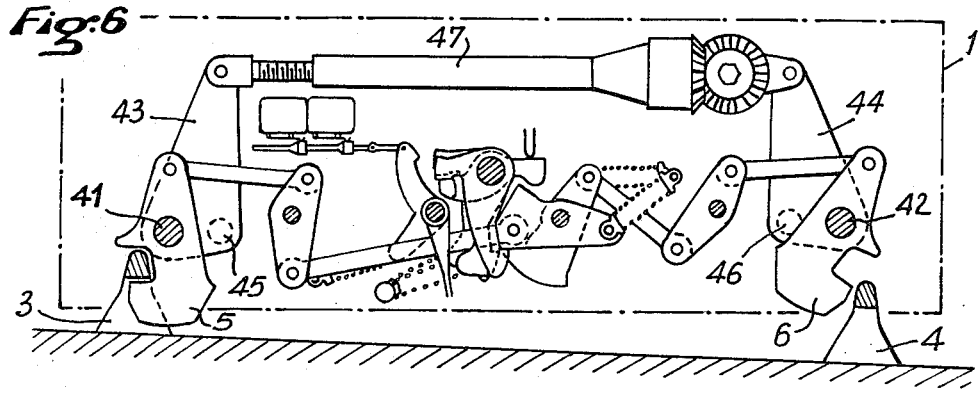
FIGS. 6, 7 and 8 illustrate the mechanism of FIG. 5 in the positions corresponding respectively to FIGS. 2, 3 and 4.
Figure 7:
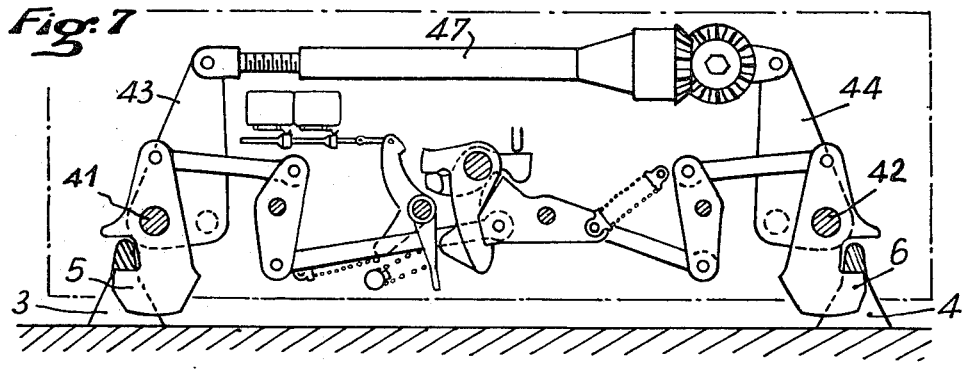
Figure 8:
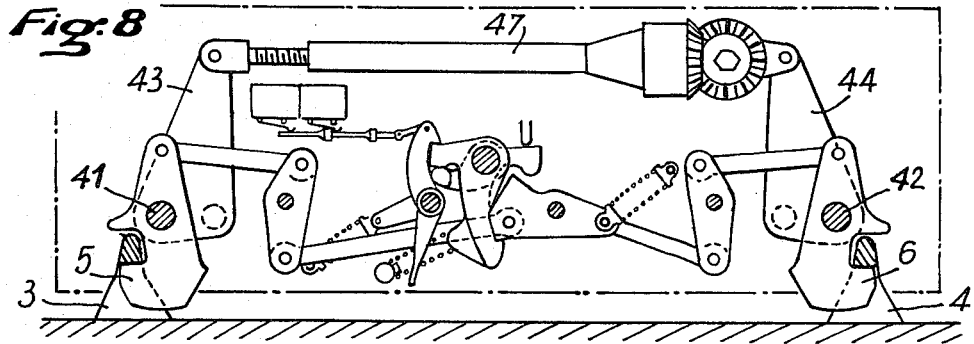

FIGS. 6, 7 and 8 illustrate the mechanism in conditions similar to those shown in FIGS. 2, 3 and 4, respectively, corresponding to the engagement of a single hook, of both hooks and to the holding of both hooks against movement, respectively.

In FIG. 9, the reference numerals 50 and 51 designate the so-called saddles rigid with the load 2 and engageable by the double hooks 52 and 53 corresponding to the hooks 5 and 6 of FIG. 5. The fixed bearings to be engaged by the saddles during the hook raising movement are shown at 54 and 55, respectively.

In FIG. 10, the reference numerals 56, 57, 58 and 59 designate the recesses formed in said saddles 50 and 51, and reference numerals 60, 61, 62 and 63 designate the retaining noses of the double hooks 52 and 53.

In FIG. 11, 65 designates the rod interconnecting the levers 43 and 44 and substituted for the stretching screw 47 of FIG. 5 for equally distributing the stress among the hooks. The central means controlling the bearing points 67 and 68 is designated by the reference numeral 66 and operative through the medium of gears (shown diagrammatically at 69 and 70).

In FIG. 12, the pair of arms acting as bearing means for properly positioning the load 2 are designated by the reference numeral 1, the load is 2 and the saddles equipping this load are shown at 50 and 51. The double hooks 52 and 53 similar to those of FIGS. 9 and 10 are fulcrumed to fixed pivot members 7 and 8 corresponding to the pivot members 7 and 8 of FIG. 1. The wedging members 75 and 76 are shown in their retracted position. Furthermore, the reference numeral 77 designates the device for releasing the wedge members after the latch members 78 and 79 corresponding to latch members 15 and 16 of FIG. 1 have been locked in position. The member 80 for detecting the positions of latch members 78 and 79 permits the operation of the wedge release device 77 (responsive to spring 81) and consequently the engagement of wedging members 75 and 76 in their operative positions due to the action exerted by springs 82 and 83 when stop members 84 and 85 are retracted as a consequence of the operation of the release control device 77.

The device according to this invention operates as follows:

Assuming that the load 2 is so raised that ring 3 engages first the open hook 5. The top portion of ring 3 lifts the counter-nose 25 of hook 5, thus causing the latter to rotate about the fixed pivot member 7 and to move gradually from the position of FIG. 1 to the position of FIG. 2. This movement is attended successively by the rotation of lever 11 caused by the compression-stressed link 9 and also by the rotation of latch member 15 about the fixed pivot member 19 through the medium of the traction-stressed rod 13 until the latch member 15 is detent-positioned by pawl 17 pivoted to member 20 and urged to its locking position by spring 23. This locking action is obtained automatically as a consequence of the force of the bistable spring 21 expanding in the proper direction when the moment driving the latch member 15 decreases due to the fact that the line of action of rod 13 approaches the centre of pivot member 19. It is obvious that this locking action prevents any reverse movement in the direction to open the hook 5.

The operation of the kinematic chain 10, 12, 14 and 16, and of pawl 18 associated with hook 6, when the latter is engaged by ring 4, is identical with the operation just described hereinabove. The bistable spring 22 associated with the latch member 16 and the other spring 24 controlling the pawl 18 produce likewise the automatic locking of hook 6 at the end of its stroke exactly as in the case of springs 21 and 23.

Considering the load as being suspended from the aircraft as shown in FIG. 3, it is possible to check and preserve the proper operation of each pawl by actuating the hand lever 32. In case of incomplete engagement of either of pawls 17 and 18, the safety check lever 27 cannot tilt completely to its safety position illustrated in FIG. 4. This position is stabilized by the bistable spring 29 and prevents any untimely release. Accessorily, this lever 27 can pull a rod 31 (FIG. 4) in order to open electric release circuit means incorporating the switches 30 when the lever 27, in the position shown in FIG. 4, prevents the retraction of pawls 17 and 18.

Before taking off, the operator restores the check lever 27 to the position shown in FIG. 3, which is stabilized by spring 29, so that the electric contacts are reclosed. The use of a safety spindle 33 of conventional type is also possible. This spindle cannot be engaged and caused to hold the pawls 17 and 18 in position unless these pawls 17 and 18 are themselves engaged home on latch members 15 and 16.

When the safety spindle 33 is removed or the check lever 27 is in the position shown in FIG. 3, the release is obtained by resorting to one of the conventional control actions as shown by the arrow overlying the lever 34 (FIG. 4) fulcrumed like the pawls 17, 18 to the fixed pivot member 20. The angular movement of lever 34 controlling simultaneously both pawls 17 and 18 with its end 35 is attended by the simultaneous release of both hooks 5 and 6.

The opposite end of lever 34 comprises a heel 36 which, according to a known arrangement, is adapted to actuate both latch members 15 and 16 in the direction to open the hooks 5 and 6 (according to the so-called "knee-breaking" arrangement) and thus remove any jamming.

The device operates in the same manner when it is used in combination with the devices disclosed and illustrated in the U.S. patent or U.S. patent application already cited hereinabove.

Now reference will be made to FIGS. 14 to 23 of the drawings, which illustrate two exemplary forms of embodiment of a safety device warranting the simultaneous opening of the two hooks as a consequence of the mutual coupling of the two relevant latch members at the end of the locking action.

In these Figures, the reference numerals 13 and 14 designate the kinematic chains connecting the load carrier hooks (not shown) to the separate latch members of the automatic locking type, also shown at 15 and 16 in FIGS. 19 to 23, but at 90 and 91 in FIGS. 14 to 18 showing equivalent detent-positioning means having however a different structure. The latch members 15 and 16 of FIGS. 19 to 23 are locked in their closed position by pawls 17 and 18. In the exemplary form of embodiment shown in FIGS. 14 to 18, the latch members 90 and 91 are fulcrumed like latch members 15 and 16 to a common fixed pivot member 19 but disposed on this member 19 on either side of an intermediate latch member 92 adapted to be locked by a pawl 93 fulcrumed to a fixed pivot member 20 designated by the same reference numeral as the common fixed pivot member of pawls 17 and 18 used in the form of embodiment illustrated in FIGS. 19 to 23 and comparable with the pawls 17 and 18 already described hereinabove.

The description of the detent-positioning mechanism of FIGS. 14 to 18 will be described first. The locking pawl 93 comprises a shank 94 engageable, as shown by the arrows in FIGS. 14 to 17, by the release system which may be of any suitable and conventional type. This shank 94 comprises a depending boss 95 adapted to act as a "knee-breaking" element so that, when the release action is starded, it will strike the end 90a of latch member 90 rigidly coupled to latch member 91 as a consequence of the closing of both hooks, as will be explained hereinafter. This pawl 93 is urged by a spring 96 in the direction to lock the intermediate latch member 92.

Figure 17:
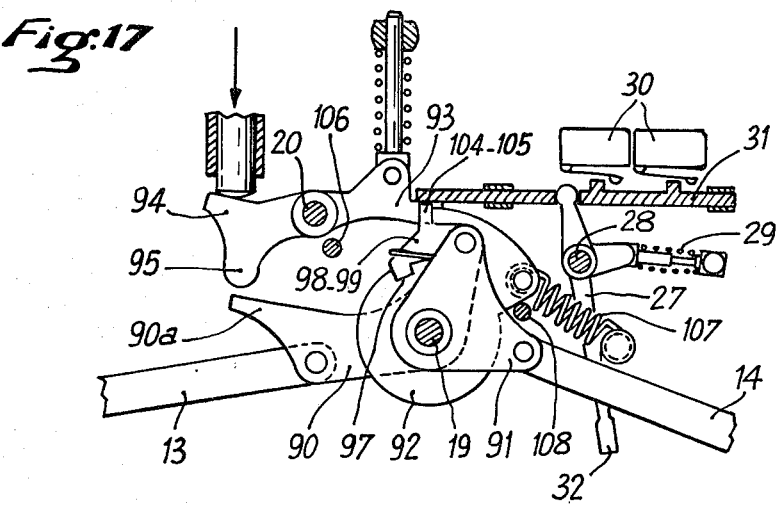
FIG. 17 is a further similar view of the mechanism but in the position corresponding to the closing of both hooks, showing the control of the proper operation of the detent positioning mechanism.
Figure 18:
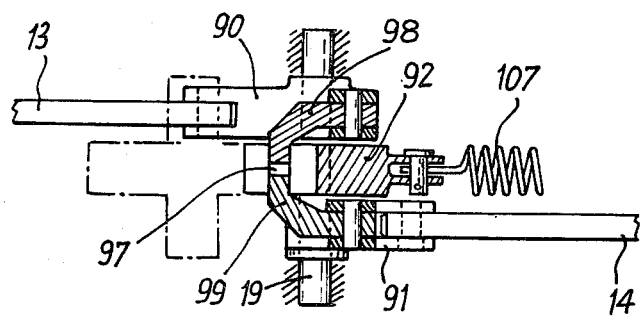
FIG. 18 is a fragmentary section showing the same mechanism, the section being taken in a horizontal plane intersecting with the axis of the common pivot pin of the latch members.

The function of this intermediate latch member 92, in the examplary form of embodiment illustrated in FIGS. 14 to 18, is to rigidly couple latch members 90 and 91 with each other. It comprises for this purpose a notch 97 engageable by the coupling pawls 98 and 99 fulcrumed to latch members 90 and 91, respectively, by means of pivot members 100 and 101, respectively. In FIG. 17, these pivot members 100 and 101 are merged into one, but in FIGS. 15 and 16 they are clearly separate from each other. The pawls 98 and 99 are urged in the direction to lock the latch member 92 by spring means shown at 102 and 103, respectively, and it is clear that after the double locking action exerted thereon the latch members 90 and 91 are rigidly interconnected. When releasing the locking pawl 93 these latch members can pivot in the counter-clockwise direction from the locking position shown in FIG. 17 until the heels 104 and 105 of pawls 98 and 99 engage a fixed stop 106, respectively, so as to cause the coupling pawls 98 and 99 to be lifted up to the position shown in FIG. 14, whereby the intermediate latch member 92 is eventually disconnected from latch members 90 and 91 and restored by another spring 107 to its return position in which it engages a fixed stop 108, this position of the intermediate latch member being the one shown in FIGS. 14 to 17.

When both hooks are open, as shown in FIG. 14, fixing a load in position will close automatically these hooks rendered independent of each other, and FIGS. 15 and 16 illustrate each the position assumed by the mechanism in the specific case of the opening of only one hook which is attended either by the engagement of the coupling pawl 98 into the groove 97 of intermediate latch member 92 (FIG. 15), or by the engagement of the coupling pawl 99 into the same groove (FIG. 16). FIG. 15 shows the pawl 99 in its release position, and FIG. 16 shows the other pawl 98 in this release position.

When both hooks are closed, the corresponding latch members 90 and 91 are both locked as a consequence of the engagement of their relevant pawls 98, 99 into the groove 97 of intermediate latch member 92, this corresponding to the position illustrated in FIG. 17 in which the three latch members 90, 91 and 92 are rigidly interconnected.

As already mentioned in the foregoing with reference to FIGS. 3 and 4, means are provided for checking and maintaining the proper detent-positioning or locking action, either in the form of a safety spindle (not shown), or in the form of a pull rod 31 which cannot be moved to the checking and safety position shown in FIG. 17 unless the pawl 93 and the heels 104, 105 of pawls 98 and 99 are at the same level, a condition that cannot be met unless the three pawls are engaged home. Pull rod 31 may be actuated by means of a lever 27 fulcrumed to a pivot member 28 and responsive to a bistable spring 29 constantly urging this lever 27 to either of its end positions when the lever is pivoted by means of a hand lever 32. It is clear that in the checking and safety position shown in FIG. 17, the pull rod 31 maintains the locked condition of pawl 93 while counteracting any release and can at the same time switch off all the electric switch circuits 30 as already mentioned with reference to FIGS. 3 and 4. It is also obvious that before an aircraft takes off while carrying a load to be jettisoned, the operator restores the safety lever 27 to the position illustrated in FIG. 14 to permit the release of pawl 93 and consequently the joint pivotal movements of both latch members 90 and 91 in the direction to open the hooks until the latch members are disconnected as already explained in the foregoing, i.e. as a consequence of the upward movement of pawls 98, 99 before the hooks are fully open, this disconnection permitting of subsequently reclosing the hooks, this action being attended by the independent locking of the latch members which become again operatively interconnected when the two hooks are closed completely.

In the exemplary form of embodiment illustrated in FIGS. 19 to 23 corresponding to FIGS. 14 to 18, respectively, the reference numerals 15 and 16 designate the latch members operatively connected to the hooks through the kinematic chains 13 and 14, respectively, these latch members being adapted to be locked independently of each other with respect to the pair of pawls 17 and 18 mounted on a common fixed pivot member 20. The pawls 17, 18 are urged to their locked position by springs 23 and 24, respectively. Also fulcrumed to the fixed pivot member 20 is a release lever 34 adapted to engage with its end 35 both pawls 17 and 18 when a release action is exerted (in the direction of the arrow in FIGS. 19 and 22) against its opposite end. This opposite end carries a boss 36 for starting, if necessary, the movement of latch members 15 and 16 in the direction to open the hooks and prevent any possible jamming thereof.

The latch member 15 is also provided with a notch 110 and the other latch 16 carries a lever 111 pivoting about a pivot member 112 and provided with a heel 113 adapted to engage the notch 110 of latch member 15 when both hooks are closed (i.e. with the mechanism in the position shown in FIG. 22). At its end opposite the heel 113, the lever 111 carries a roller 114 adapted to be actuated when opening the hooks by means of a fixed cam face 115 causing the lever 111 to pivot against the force of a cocking spring 116 when the two latch members, during a release action, are moved to the position shown in FIG. 19.

Figure 19:
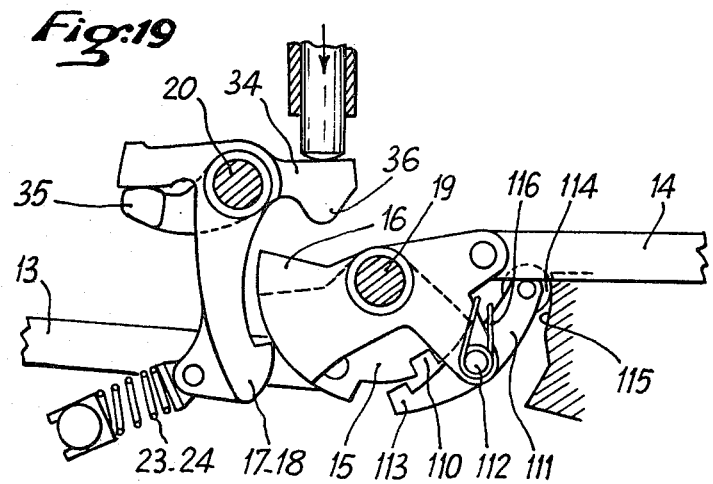

The operation of the device shown in FIGS. 19 to 23 is equivalent to the operation of the device of FIGS. 14 to 18. When the two hooks are open, the corresponding latch members 15 and 16 are independent of each other as shown in FIG. 19, and it is possible to latch one of them by closing the corresponding hook as shown in FIGS. 20 and 21. When both latch members are locked with respect to pawls 17 and 18, respectively, as a consequence of the closing of both hooks (FIG. 22), the heel 113 of lever 111 engages the notch 110 of latch member 15 as a consequence of the resilient force exerted by spring 116, so that the two latch members become rigidly interconnected, and when the release is caused by an action exerted in the direction of the arrow in FIGS. 19 and 22, the two latch members pivot in unison from the position shown in FIG. 22, in the counter-clockwise direction (as seen in FIGS. 19 to 22), until the hooks are fully open. However, before this fully open position is obtained as shown in FIG. 19, the rotation of latch member 16 has caused the roller 114 to engage cam face 115, thus tilting lever 111 and releasing the heel 113 from notch 110, whereby the two latch members 15 and 16 are subsequently disconnected. It will be seen in FIG. 19 that the release lever 34 is shown in its release position with its end 35 engaging the pawls 17 and 18, but it is also clear that in the inoperative condition of the release control means a play is formed between the end 35 and pawls 17, 18 in their release position, as shown by each FIGS. 20 and 21, for the specific pawl momentarily held in its release position; restoring of the pawls to their locked condition will cause the latch members 17, 18 to move towards the end 35 of lever 34, as shown in FIG. 22.

Now the specific arrangement of the effort scaling-down mechanism illustrated in FIGS. 24 to 29 will be described in detail.

The diagrammatic and approximate contour of the load carrier device is shown in dash-and-dot lines at 201, and 202 is the load proper provided with suspension rings 203 and 204, the hooks of the carrier device being designated by the reference numerals 205 and 206; these hooks are fulcrumed to fixed pivot members 207 and 208, respectively. Reference numerals 209 and 210 designate the fixed fulcri of the tilting supports 211, 212 of pawls 213 and 214, respectively, pivoting on said supports 211 and 212 by means of pivot members 215 and 216, respectively, and urged to their locked or detent-positions by return springs 217 and 218, respectively. Reference numerals 219 and 220 designate the fixed pivot points of effort scaling-down knee-action devices 221, 222 and 223, 224 pivotally connected on the other hand at 225 and 226 to the aforesaid tilting supports 211 and 212. The operative connection between one knee-action device 221, 222 and the other knee-action device 223, 224 takes place through a rod 227, this connection taking place more particularly between the movable central pivot member 228 of knee-action device 221-222 and a bell-crank lever 230 fulcrumed to a fixed pivot member 231 and connected via a cocking link 245 to the movable central pivot member 229 of knee-action device 223, 224. A traction spring 232 constantly urges the connecting member 227 in the release direction, i.e. to the left as seen in FIG. 24. A common knee-action device 233, 234 is pivotally connected on the one hand to the fixed pivot member 235 and on the other hand to a point 236 rigid with the aforesaid bell-crank lever 230. The element 233 of knee-action device 233, 234 comprises a latch portion 237 adapted to engage and retain a roller 238 carried by a lever 239 fulcrumed to a fixed pivot member 240. This lever 239 is constantly urged by another traction spring 243 in the direction to cause its locking engagement with the latch portion 237 of element 233. The release is obtained, as usual, either manually by using a driving square-sectioned member 241 or equivalent means, or by resorting to another known method illustrated diagrammatically in the form of a rod 242 responsive to pyrotechnical means or any other suitable source of power. The lever 239 further comprises a "knee-breaking" nose 244 of which the well-known function is to prevent a possible jamming of the knee-action device 233, 234. The pressure exerted by latch member 237 on roller 238 urged to its locking position by spring 243 is obtained by exerting a manual action on another driving square-sectioned member 248 or the equivalent portion of element 233, i.e. of the latch portion 237 incorporated therein.

In FIGS. 28 and 29, the reference numerals 250 and 251 designate the feelers of pawls 213 and 214 having their ends at 252 and 253, and fulcrumed at 254 and 255 to the symmetrical bell-crank levers 256 and 257 fulcrumed in turn to fixed pivot members 258 and 259, respectively. The reference numeral 260 designates the common coupling of bell-crank levers 256 and 257 to a link 261 pivotally connected at one point 262 to a lever 263 pivoted about a fixed pin 264 and provided with a manual control knob 265. An element 266 rigid with lever 263 is provided for simultaneously checking the position of locking lever 239 in relation to the latch member 237.

Now the operation of the device will be described, by assuming from the onset that after a first operation both hooks 205 and 206 are open and that the completed device is in its released condition as shown in FIG. 24.

A cocking action preliminary to another actuation consists in rotating the lever 233 in the direction of the arrow of FIG. 25 for causing the latch member 237 to engage the roller 238 urged to the position shown in FIG. 25 by the spring 243. Thus, both elements 233 and 234 of the common knee-action device are nearly aligned with each other and an effort exerted in the axial direction of member 234 can only produce a moderate tilting movement of element 233 about its pivot member 235.

The movement of point 236 is attended by the cocking of both knee-action devices 221, 222 and 223, 224, through connecting rod 227 for the first device 221, 222, and through bell-crank lever 230 and link 245 against the force of spring 232 for the second device 223, 224. Both knee-action devices 221, 222 and 223, 224 are thus brought to the position shown in FIG. 25 so as to act as an effort scaling-down device and drive in the direction of the arrows of FIG. 25 the tilting supports 211 and 212 or which the pawls 213 and 214 are then in a waiting locking position with springs 217 and 218 in their stressed condition.

It will be readily understood that as long as the roller 238 locks the latch member 237, the system comprising three effort scaling-down knee-action devices remains irreversible. On the other hand, the hooks 205 and 206 can pivot freely about the fixed pivot members 207 and 208. The light springs urging the hooks to their open position, so that they are "wide open" when the load 202 is presented thereto, are not shown.

Now it will be assumed that the load 202 is so hoisted that the ring 204 engages first the open hook 206, as illustrated in FIG. 26. The upper portion of ring 204 engaging the counter-beak of hook 206 causes the latter to rotate about the fixed pivot member 208 so that the hook will move gradually from the position shown in FIG. 24 (or FIG. 25) to the position shown in FIG. 26 which fix the closed-hook position. The pawl 214 urged by the companion spring 218 is thus able to move downwards behind the heel 247 of hook 206 to prevent any reverse movement in the opening direction. The locking or detent-positioning of hook 205, when the latter is urged by ring 203, is the same as that just described with reference to hook 206.

While means had been provided, with reference to FIG. 3 and 4, for checking the proper detent-positioning or locking of the pawls, a mechanism for checking simultaneously the proper operation of pawls 213 and 214 has also been contemplated, as shown in FIGS. 28 and 29. This checking step takes place manually by moving the knob 265 of lever 263 in the direction of the arrow. This lever 263 can pivot about the fixed pivot member 264 so as to push upwards, as seen in FIG. 28, the link 261. The bell crank levers 256 and 257 having a common coupling point at 260 with respect to the link 261 are urged for simultaneous rotation in the direction of the arrows. If the pawls 213 and 214 are engaged completely with respect to the noses 246 and 247 of hooks 205 and 206, the ends 252 and 253 of feelers 250 and 251 rigid with said bell-crank levers 256 and 257 may move above the pawls 213 and 214, and the checking mechanism may assume the position shown in FIG. 28. Besides, the feelers 250 and 251 are likely to cause a proper detent positioning of the pawls, or of one of them. On the other hand, if the pawls 213 and 214 are not engaged, the feelers 250 and 251 will abut the pawl ends, whether the release mechanism is cocked or not, thus preventing the actuation of the lever, as shown in FIG. 29.

It will be readily understood by those conversant with the art that in case only one pawl were not fully engaged, the corresponding feeler may either cause its complete engagement so that the first case is restored, or abute the pawl end. This abutment against a single pawl is sufficient to prevent the actuation of lever 263 since it locks the link 261 against movement. Besides, the proper detent-positioning or locking of latch member 237 on lever 239 is also observed (see FIGS. 24 and 27). Moreover, a safety spindle, as usually employed according to an arrangement not claimed herein, is sufficient for warranting the general safety by positively counteracting the release.

Assuming the load to be suspended as shown in FIG. 27, it can be released at the ground by manual actuation for example by means of a spanner engaging the drive square-sectioned stub shaft 241, so as to rotate the lever 239 about the axis 240 (against the force of spring 243) in the direction of the arrow, so that the roller 238 will be retracted. Thus, the latch member 237 cannot bear on any other member and if necessary it may be actuated by the knee-breaking member 244, so that the mechanism is no more retained. The load weight actuates the hooks 205 and 206 through the medium of rings 203 and 204 in the direction of the arrows (FIG. 24). The heels 246 and 247 of hooks 205 and 206 bear against pawls 213 and 214, thus causing the pivoting supports 211 and 212 to pivot in the direction of the arrows of FIGS. 24 and 27, this movement being assisted by the action exerted by spring 232 against the connecting rod 227, so that both knee-action devices 221, 222 and 223, 224 are bent simultaneously.

At the end of the tilting movement of supports 211, 212, the heels 246 and 247 of hooks 205 and 206 are fully released from pawls 213 and 214, and the hooks 205, 206, urged by the load weight, open completely as illustrated in FIG. 24.

The knee-action devices 221, 222 and 223, 224 cannot reclose separately since the connecting rod 227 urged by spring 232 and acting on the other hand as a knee-breaking device compels these devices to operate simultaneously. As a result, the hooks 205 and 206, responsive to a relatively powerful driving movement in the opening direction and not capable of remaining jammed the one without the other, are thus caused to open necessarily simultaneously.

During a flight, the jettisoning operation takes place in the same manner, the load being released under all conditions by retracting the roller 238, but the rotation of lever 239 is controlled in this case by the momentary upward movement of piston 242, as shown in FIG. 27. This movement requires the use of pyrotechnical, electrical or other power sources, according to a known method not disclosed in the present patent application. The piston 242 may be returned to its retracted position by the spring 243 or any other conventional means.

It will readily occur to those conversant with the art that many modifications and changes may be brought to the forms of embodiment of the invention shown and described herein, without departing inasmuch from the basic principles of the invention as set forth in the appended claims.

What we claim is:

1. A device for releasably transporting loads under aircraft comprising:
    a pair of pivoted suspension hooks adapted to co-act with suspension members rigid with the load to be transported,
    a first effort scaling-down linkage connecting a first suspension hook of said pair to a first movable latch member,
    a second effort scaling-down linkage connecting a second suspension hook of said pair to a second movable latch member,
    a first fixed pivot pin on which are mounted to pivot, independently the one from the other, said first and second latch members,
    a first pawl member adapted to be engaged by said first latch member to ensure the locking thereof,
    a second pawl member adapted to be engaged by said second latch member to ensure the locking thereof,
    a second fixed pivot pin on which are mounted said first and second pawl members to pivot the one independently from the other,
    a release member pivotally mounted on said second pivot pin and adapted to actuate both first and second pawl members simultaneously in a release direction to cause a simultaneous release of said first and second latch members,
    so that, said first and second hooks being in open position, each hook may be closed and locked independently from the other when the load is placed in suspension position, while a simultaneous release of the two hooks is obtained.

2. A device as claimed in claim 1, comprising means for raising the suspension hooks to wedge the load in relation to fixed bearing points, and a central control system with means for equally distributing the stress among the suspension hooks.

3. A device as claimed in claim 1, comprising means for the downward movement of the bearing points with respect to the load for wedging said load, and a central control system with means for equally distributing the stress among the suspension hooks.

4. A device as claimed in claim 1, wherein wedge members are provided to engage the load.

5. A device as claimed in claim 1, wherein safety means for positively and simultaneously opening the pair of hooks are provided, said safety means comprising means which ensure automatically a coupling of said first and second latch members at the end of the locking operation thereof and which maintain this coupling until the two hooks open simultaneously and nearly completely.

6. A device as claimed in claim 5, wherein said first and second latch members are adapted, at the end of the closing movement of the corresponding suspension hooks, to be locked in relation to a single intermediate latch member retained by a single release pawl so that said first and second latch members become temporarily rigidly coupled to each other.

7. A device as claimed in claim 6, wherein said intermediate latch member is constantly urged by spring means in a locking position.

8. A device as claimed in claim 6, wherein means are provided to cause said first and second latch members to be released when said intermediate latch member is released.

9. A device as claimed in claim 8, wherein a fixed stop is provided to cause, at the end of the hook opening movement, said first and second latch members to be disconnected from said intermediate latch member.

10. A device as claimed in claim 5, wherein said first and second latch members are positively coupled with each other by causing a coupling pawl associated with one of said first and second latch members to engage a notch formed in the other of said first and second latch members.

11. A device as claimed in claim 10, wherein a cam face is provided to be engaged, at the end of the hook opening movement, by the coupling pawl to raise said coupling pawl out of the corresponding notch and thus to automatically disconnect said first and second latch members.

12. A device for releasably transporting loads under aircraft comprising:
   a pair of pivoted suspension hooks adapted to co-act with suspension members rigid with the load to be transported, each suspension hook having a closed position and a released position,
   a first independent pivoting locking member associated with a first suspension hook of said pair,
   a second independent pivoting locking member associated with a second suspension hook of said pair,
   a first pivoting support at one end of which is pivoted said first locking member and at the other end of which is pivoted one end of a first effort scaling-down device adapted to absorb at least a main part of the force applied to the first locking member by the loaded first suspension hook,
   a second pivoting support at one end of which is pivoted said second locking member and at the other end of which is pivoted one end of a second effort scaling-down device adapted to absorb at least a main part of the force applied to the second locking member by the loaded second suspension hook,
   a member connecting said first and second effort scaling-down devices in order that a movement of said connecting member in one direction puts said first and second effort scaling-down devices in an operative position whereas a movement in the opposite direction puts said first and second effort scaling-down devices in a release position, and
   means for locking said connecting member in a position allowing each suspension hook to be locked in its closed position and for selectively releasing said connecting member to cause the two suspension hooks to be automatically and simultaneously placed in their released position,
whereby there is applied to said locking means of the connecting member on a reduced force which avoids any risk of jamming of said locking means when actuating it to release the two suspension hooks.

13. A device, as claimed in claim 12, wherein said connecting member is retained by its locking means through the medium of a third effort scaling-down device.

14. A device, as claimed in claim 12, wherein the positioning of said connecting member in its locking position ensures a simultaneous positioning of said first and second locking members in positions adapted to independently ensure the locking of said first and second suspension hooks under the action of the load to be transported.

15. A device, as claimed in claim 12, wherein the positioning of the connecting member in its release position is attended by the simultaneous release of said suspension hooks while causing the simultaneous rotation of each one of said effort scaling-down devices associated therewith respectively.

16. A device for releasably transporting loads under aircraft comprising:
   a pair of pivoted suspension hooks adapted to coact with suspension members rigid with the load to be transported, each suspension hook having a closed position and a released position,
   a first independent pivoting locking member associated with a first suspension hook of said pair,
   a second independent pivoting locking member associated with a second suspension hook of said pair,
   a first effort scaling-down device coacting with said first locking member,
   a second effort scaling-down device coacting with said second locking member,
   a member connecting said first and second effort scaling-down devices,
   means for locking said connecting members in a position allowing each suspension hook to be locked in its closed position and for selectively releasing said connecting member to cause the two suspension hooks to be automatically and simultaneously released, and
   a safety and checking mechanism comprising movable members associated respectively with each of said locking members, and a single control member for simultaneous actuation of said movable members, said locking means permitting the actuation of said single control member only if all of said locking members are in a proper locking position, whereby verification of the proper locking positioning of the two suspension hooks and also of the assembly of effort scaling down devices may be obtained by a single control action.

* * * * *